United States Patent
Barnett

[11] 4,225,156
[45] Sep. 30, 1980

[54] PASSIVE RESTRAINT BELT SYSTEM

[75] Inventor: Ronald R. Barnett, Rochester, Mich.

[73] Assignee: General Motors Corporation, Detroit, Mich.

[21] Appl. No.: 23,970

[22] Filed: Mar. 26, 1979

[51] Int. Cl.² .............................................. B60R 21/10
[52] U.S. Cl. ..................................... 280/804; 280/800
[58] Field of Search ............... 280/802, 803, 804, 807, 280/808; 180/82 C, 268; 297/469, 483

[56] References Cited
U.S. PATENT DOCUMENTS

| | | | |
|---|---|---|---|
| 3,583,726 | 6/1971 | Lindblad | 296/152 |
| 3,680,883 | 8/1972 | Keppel | 280/803 |
| 3,770,078 | 11/1973 | Keppel | 180/111 |
| 3,770,294 | 11/1973 | Hammer | 280/803 |
| 3,882,955 | 5/1975 | Kaneko | 180/82 C |
| 3,933,369 | 1/1976 | Kaneko | 280/803 |

Primary Examiner—Robert R. Song
Assistant Examiner—Randall A. Schrecengost
Attorney, Agent, or Firm—Charles E. Leahy

[57] ABSTRACT

A shoulder belt carriage track extends longitudinally along the door window frame. The outboard shoulder belt end is attached to the window frame adjacent the rear end of the track and the inboard shoulder belt end is retractably mounted on the vehicle body inboard the occupant. A shoulder belt carriage is movable fore and aft along the track and slidably engages the shoulder belt. A rigid link has a rearward end pivotally connected to the carriage and a forward end mounted on the vehicle body. The fixed length of the rigid link is such that when the door is closed the carriage is established at the rear end of the track adjacent the end of the shoulder belt so that the shoulder belt is disposed in the normal diagonal position across the upper torso of the occupant. During door opening movement the link forcibly pulls the carriage forwardly to establish the shoulder belt in an occupant access position forwardly of the occupant. The link forcibly pushes the carriage rearwardly when the door is closed to reestablish the occupant restraining position of the shoulder belt.

1 Claim, 2 Drawing Figures

PASSIVE RESTRAINT BELT SYSTEM

The invention relates to a passive occupant restraint system and more particularly to a passive shoulder belt having an upper end movable between a rearward occupant restraining position and a forward occupant access position.

BACKGROUND OF THE INVENTION

It is well known to restrain an occupant in a seat by a shoulder belt extending diagonally across the upper torso between an inboard anchorage generally adjacent the hip of the occupant and an outboard anchorage on the roof rail or pillar of the vehicle body generally adjacent and behind the shoulder of the seat occupant. U.S. Pat. No. 3,680,883, issued to Keppel et al on Aug. 1, 1972, provides a track extending longitudinally along the roof rail and mounting a belt carriage which slidably receives the belt. The belt carriage is movable forwardly along the track to stow the diagonal shoulder belt forwardly of the occupant seat to facilitate occupant ingress and egress and rearwardly along the track to establish the shoulder belt in its normal occupant restraining position. The carriage of Keppel may be moved between the forward and rearward positions by an electric motor driven pulley or worm gear arrangement or by a mechanical drive pulley arrangement such as shown in U.S. Pat. No. 3,770,078, issued to Keppel et al on Nov. 6, 1973. Another means of moving the carriage along the roof rail is disclosed in U.S. Pat. No. 3,770,294, issued to Hammer on Nov. 6, 1973, where a cable extends between the belt and the door to pull the belt forwardly as the door is opened and a spring wound cable pulls the belt rearwardly when the door is closed.

U.S. Pat. No. 3,882,955, issued to Kaneko May 13, 1975, discloses a similar lap and shoulder belt system where the shoulder belt is attached to the door and the track for the shoulder belt carriage extends along the door window frame.

SUMMARY OF THE INVENTION

According to the present invention a shoulder belt carriage track extends longitudinally along either the roof rail member adjacent the door opening or along the door window frame member. The outboard end of the shoulder belt is attached adjacent the rearward end of the track and the inboard shoulder belt end is retractably mounted on the vehicle body inboard the occupant seating position. A shoulder belt carriage is movable fore and aft along the track and slidably engages the shoulder belt. A rigid link has a rearward end pivotally connected to the carriage and a forward end mounted on the other member. The fixed length of the rigid link is such that when the door is closed the carriage is established rearwardly adjacent the end of the shoulder belt so that the shoulder belt is disposed in the normal diagonal position across the upper torso of the occupant. During door opening movement the link forcibly pulls the carriage forwardly to establish the shoulder belt in an occupant access position forwardly of the occupant and forcibly pushes the carriage rearwardly when the door is closed to reestablish the occupant restraining position of the shoulder belt.

Accordingly, the object, feature and advantage of the invention resides in the provision of a passive restraint system wherein a track mounted carriage slidably engages the shoulder belt and is forcibly moved fore and aft by a fixed length rigid link extending between the carriage and a body member which moves relative the track during door opening movement.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
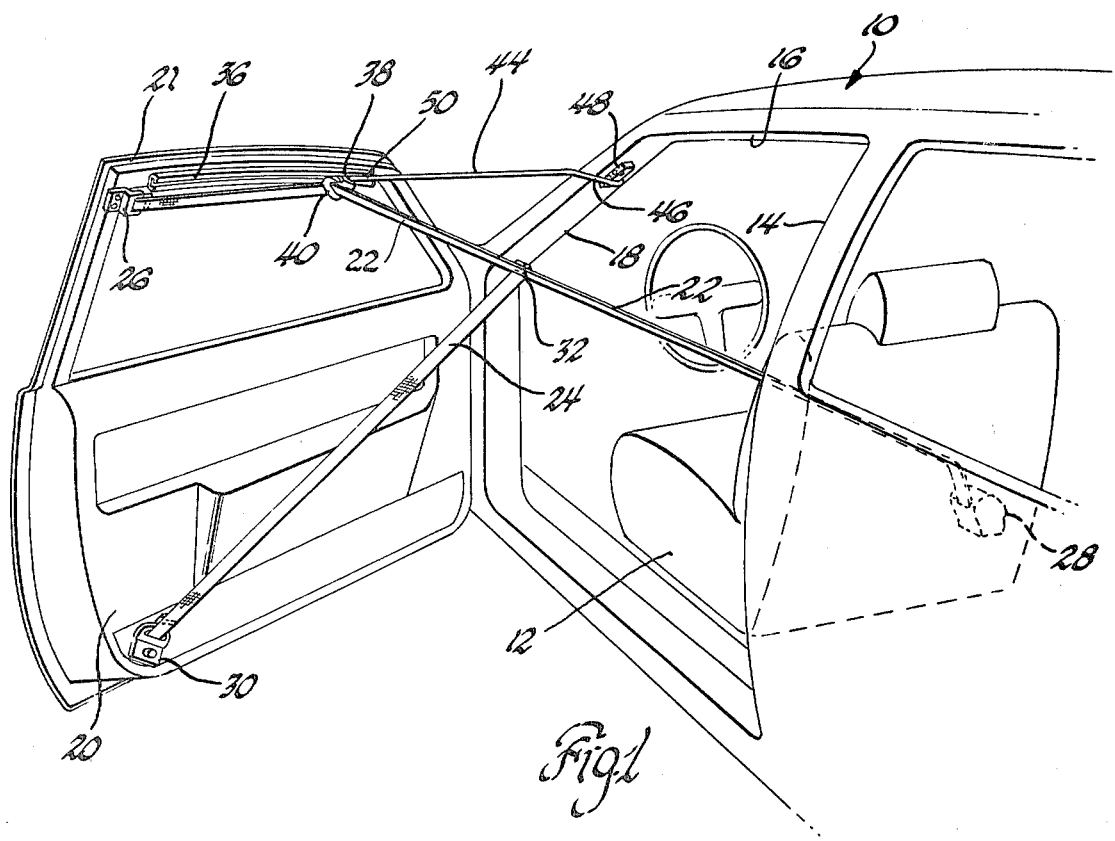
FIG. 1 is a perspective view of the vehicle body having the passive occupant restraint system of this invention moved forwardly to an occupant access position when the door is in the open position.

Referring to FIG. 1, there is shown a vehicle body 10 having a seat 12 located laterally adjacent a door opening 14 defined in part by a longitudinally extending roof rail 16 having a forwardmost angularly inclined portion 18. A door 20 having a window frame member 21 is hingedly mounted on the vehicle body 10 for movement between an open position shown in FIG. 1 and a closed position shown in FIG. 2.

A passive occupant restraint system for restraining an occupant in the seat 12 includes a shoulder belt 22 and a lap belt 24. The outboard end of the shoulder belt 22 is attached to the upper rearward portion of the door 20 by an anchorage 26. The inboard end of the shoulder belt 22 is mounted inboard the seat 12 and generally adjacent the occupant hip by a conventional inertia locking retractor 28. The outboard end of the lap belt 24 is attached to the lower rear corner of the door 20 by an anchorage 30. The inboard end of the lap belt 24 is attached to the shoulder belt at a juncture designated 32.

As best seen in FIG. 1, a track 36 is attached to the door window frame 21 and extends generally longitudinally therealong. A shoulder belt carriage 38 is captured for fore and aft sliding movement along the track 36 and has a belt loop 40 which slidably encircles the shoulder belt 22. A rigid link 44 has a forward end 46 which is pivotally attached to the roof rail 16 by a pivot block 48. The rearward end 50 of the rigid link 44 is pivotally attached to the shoulder belt carriage 38.

Figure 2:
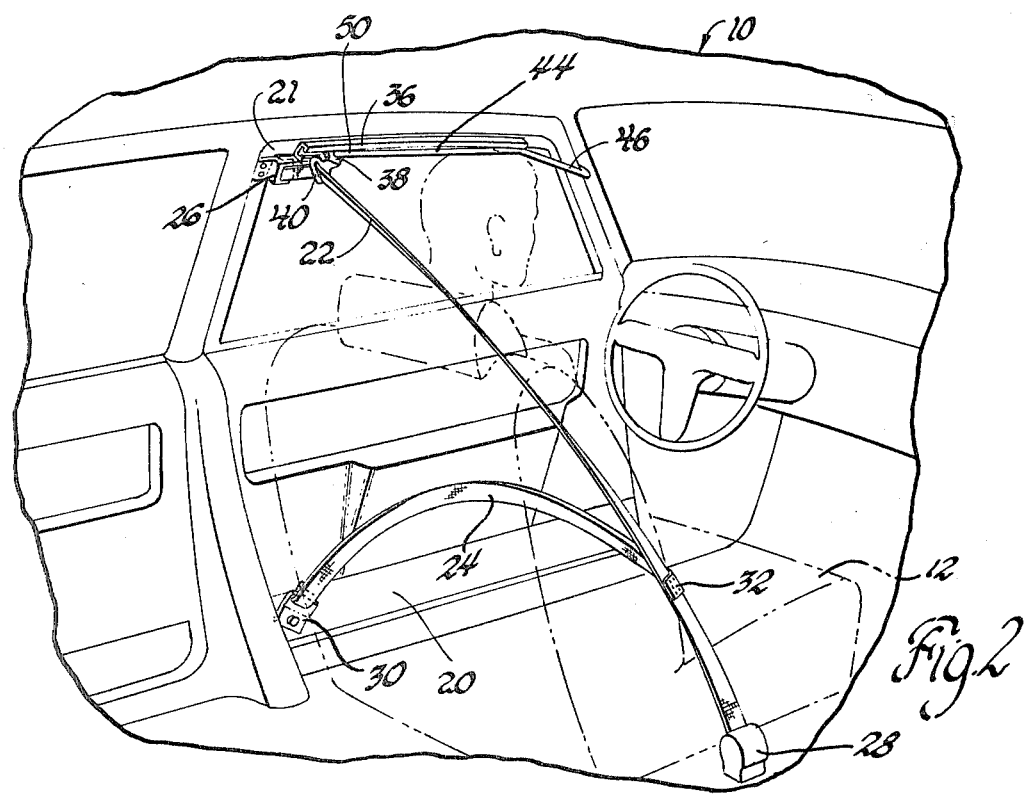
FIG. 2 is a perspective view of the vehicle body having the restraint system established in the occupant restraining position when the door is in the closed position.

Referring to FIG. 2, it is seen that when the door is closed the track 36 and the rigid link 44 lie generally parallel with one another and the length of the rigid link 44 is such that the shoulder belt carriage 38 is established at the rearward end of the track 36 and generally adjacent the shoulder belt anchorage 26. Accordingly, when the door is closed, the shoulder belt 22 extends between the anchorage 26 and the retractor 28 to assume a normal diagonal restraining position across the upper torso of the seated occupant. Simultaneously, the lap and shoulder belt juncture 32 is established inboard the occupant so that the lap belt 24 is disposed across the occupant lower torso.

Referring to FIG. 1, it will be understood that outward swinging movement of the door 20 and the track 36 therewith to the position of FIG. 1 causes the rigid link 44 to forcibly pull the shoulder belt carriage 38 forwardly along the track. Accordingly, a portion of the shoulder belt 22 is stowed along the window frame 21 so that the remaining portion of the shoulder belt 22 is positioned substantially forward of the seated occupant and moves the lap belt outwardly, upwardly and forwardly away from the seated occupant.

When the door is closed, the rigid link 44 forcibly pushes the shoulder belt carriage 38 rearwardly to reestablish the shoulder belt carriage 38 at its rearward position of FIG. 2, thereby cooperating with the winding effort of the retractor 28 to reestablish the lap and shoulder belts in their respective occupant restraining positions of FIG. 2.

While this invention has been disclosed primarily in terms of the specific embodiment shown in the drawings, it is not intended to be limited thereto but rather only to the extent set forth in the appended claims. For example, while the drawings show the outboard shoulder belt end and the track mounted on the door window frame, it is within the scope of the invention to mount the outboard shoulder belt end and the track on the roof rail. Accordingly, the forward end of the rigid link 44 would be mounted on the forward portion of the door window frame 21 so that the carriage 38 would be forcibly moved forwardly during door opening movement and rearwardly during door closing movement.

Thus, the invention provides a new and improved occupant restraint system which is automatically moved between the restraining and the unrestraining positions in response to movement of the door between the open and closed positions.

The embodiments of the invention in which an exclusive property or privilege is claimed are defined as follows:

1. In combination with a vehicle body having an occupant compartment in which an occupant seat is accessible through a door opening defined by a door opening structure of the vehicle body and selectively opened and closed by a movable door having a longitudinally extending window frame, a passive occupant shoulder belt arrangement comprising:

a shoulder belt having a outboard end fixedly mounted on the window frame and an inboard end retractably mounted on the vehicle body inboard the occupant seat to retract the belt to a diagonal restraining position across the occupant when the door is closed and to extend the belt when the door is open;

a track extending longitudinally along the window frame;

a carriage movable along the track and slidably engaging the shoulder belt;

and a rigid link of fixed length having a forward end pivotally mounted on the vehicle body door opening structure and a rearward end pivotally connected with the carriage to pull the carriage forwardly along the track during door opening movement to move the shoulder belt forward of the occupant and to push the carriage rearwardly upon closing movement of the door to establish the carriage in juxtaposition with the outboard fixed end of the shoulder belt and thereby return the belt to the diagonal restraining position.

* * * * *